(12) United States Patent
Shirakawa et al.

(10) Patent No.: US 6,397,247 B1
(45) Date of Patent: May 28, 2002

(54) FAILURE PREDICTION SYSTEM AND METHOD FOR A CLIENT-SERVER NETWORK

(75) Inventors: Takahisa Shirakawa, Tokyo; Reiko Kanamaru, Fukuoka, both of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/273,528

(22) Filed: Mar. 22, 1999

(30) Foreign Application Priority Data

Mar. 25, 1998 (JP) .......................................... 10-077428

(51) Int. Cl.[7] ........................ G06F 15/173; G06F 15/16
(52) U.S. Cl. ........................ 709/223; 709/203; 714/4; 714/2
(58) Field of Search ................................. 709/203, 223; 714/2, 4, 15

(56) References Cited

U.S. PATENT DOCUMENTS

| | | | | |
|---|---|---|---|---|
| 5,396,613 A | * | 3/1995 | Hollaar | 714/4 |
| 5,566,297 A | * | 10/1996 | Devarakonda et al. | 714/15 |
| 5,845,061 A | * | 12/1998 | Miyamoto et al. | 714/4 |
| 6,247,141 B1 | * | 6/2001 | Holmberg | 714/2 |

* cited by examiner

Primary Examiner—Krisna Lim
(74) Attorney, Agent, or Firm—Young & Thompson (57) ABSTRACT

A failure factor extracting element of a server computer extracts particulars of failure and factors accountable for the failure from a client failed execution environment information database; a client identifying element identifies from a client configuration information database a client computer (s) that may repeat the extract failure factor; a failure prediction information transmitting element transmits to the identified client(s) failure prediction information; a failure prediction information receiving element of the client receives failure prediction information from the server; a failure prediction information storing element stores the failure prediction information into a database; a failure factor checking element checks whether the execution environment of the currently operating client to which it belongs involves any failure factor stored in the failure prediction information database; and a notifying element supplies failure prediction information to an output unit if the failure factor checking element has judged that any failure factor is involved.

25 Claims, 3 Drawing Sheets

FAILURE PREDICTION SYSTEM AND METHOD FOR A CLIENT-SERVER NETWORK

BACKGROUND OF THE INVENTION

1. Field of the Invention

The present invention relates to a failure prediction system, a failure prediction method, and a recording medium recording failure prediction program thereon, and more particularly to a failure prediction system, a failure prediction method, and a recording medium recording failure prediction program thereon for predicting any more software failure that may subsequently arise.

2. Description of the Related Art

Along with the increasingly extensive use of personal computers, the importance of software intended for use in routine operations in business corporations and handling of miscellaneous affairs in households is growing, and many such software products been developed.

However, as software becomes more and more multifunctional, software failures tend to increase, posing an extremely grave problem.

If any software at work runs into trouble, the work done before the trouble may be wasted, the data stored may be destroyed, and restoration may take a long time.

In view of this problem, there have been used, among others, techniques to automatically save the file at regular intervals and others to trap the software failure and save the file involved.

However, these techniques according to the prior art are still beset with the problem of inability to reduce the frequency of failure occurrence.

SUMMARY AND OBJECTS OF THE INVENTION

An object of the invention is to provide a failure prediction system, a failure prediction method, and a recording medium recording failure prediction program thereon for predicting anymore software failure that may subsequently arise.

A first failure prediction system according to the invention comprises a plurality of client computers and a server computer for managing the plurality of client computers linked by a communication network, wherein: said server computer is provided with a means for preparing, on the basis of information on the particulars of any failure that may arise in any client computer and the environment of execution at the time of failure occurrence, failure prediction information including the particulars of the failure and factors accountable for the failure, and transmitting the prepared information to some or all of said plurality of client computers; and each of said plurality of client computers is provided with a means for receiving said failure prediction information including the particulars of the failure and factors accountable for the failure, and checking whether or not its own environment of execution involves the factors accountable for the failure.

A second failure prediction system according to the invention comprises a plurality of client computers and a server computer for managing the plurality of client computers linked by a communication network, wherein: said server computer comprises a client configuration information database in which are restored, classified by client computer, hardware configuration information and software configuration information on each of said plurality of client computers; a client failed executional environment database in which is stored, classified by the type of failure, information on the executional environment at the time of failure occurrence on each of said plurality of client computers; a client failure factor database to serve as the location of storage of the particulars of the failure and factors accountable for the failure; a failure factor extracting means for extracting from said client failed executional environment database the particulars of the failure and factors accountable for the failure, and storing them into said client failure factor database; a client identifying means for identifying, on the basis of the hardware configuration information and the software configuration information on each of said plurality of client computers stored in said client configuration information database, the client computer s that may repeat the failure factor extracted by said failure factor extracting means; and a failure prediction information transmitting means for transmitting, to each client computer identified by said client identifying means, failure prediction information including the particulars of the failure and factors accountable for the failure; and each of said plurality of client computers comprises a failure prediction information database to serve as the location of storage of failure prediction information including the particulars of the failure and factors accountable for the failure; a failure prediction information receiving means for receiving failure prediction information including the particulars of the failure and factors accountable for the failure from said server computer; a failure prediction information storing means for storing failure prediction information including the particulars of the failure and factors accountable for the failure that has been received into said failure prediction information database; a failure factor checking means for checking whether or not the executional environment of its own client computer currently in operation involves any of the failure factors stored in said failure prediction information database; and a failure prediction information notifying means for supplying an output unit with failure prediction information including the factors accountable for the failure and the particulars of the failure when said failure factor checking means has judged that the executional environment of its own client computer currently in operation involves any of the failure factors stored.

A third failure prediction system according to the invention comprises a plurality of client computers and a server computer for managing the plurality of client computers linked by a communication network, wherein: each of said plurality of client computers comprises a configuration information transmitting means for transmitting its own hardware configuration information and software configuration information to said server computer; and said server computer comprises a configuration information receiving means for receiving hardware configuration information and software configuration information from each of said plurality of client computers, a client configuration information database in which are stored, classified by client computer, hardware configuration information and software configuration information on each of said plurality of client computers, and a configuration information storing means for storing hardware configuration information and software configuration information that has been received into said client configuration information database.

A fourth failure prediction system according to the invention comprises a plurality of client computers and a server computer for managing the plurality of client computers linked by a communication network, wherein: each of said plurality of client computers comprises a failure detecting means for detecting any software failure having arisen in itself, and a failed executional environment information transmitting means for transmitting, when any software failure has arisen in itself, information on the particulars of the failure and on the executional environment at the time of the failure occurrence to said server computer; and said server computer comprises a failed executional environment information receiving means for receiving, from the client computer in which any software failure has arisen, information on the particulars of the failure and on the executional environment at the time of the failure occurrence, a client failed executional environment database in which is stored, classified by the type of failure, information on the executional environment at the time of failure occurrence on each of said plurality of client computers, and a failed executional environment information storing means for classifying, by the type of failure, said information on the particulars of the failure and on the executional environment at the time of the failure occurrence that has been received, and storing it into said client failed executional environment database.

A fifth failure prediction system according to the invention comprises a plurality of client computers and a server computer for managing the plurality of client computers linked by a communication network, wherein: said server computer comprises a client configuration information database in which are stored, classified by client computer, hardware configuration information and software configuration information on each of said plurality of client computers; a client failed executional environment database in which is stored, classified by the type of failure, information on the executional environment at the time of failure occurrence on each of said plurality of client computers; a client failure factor database to serve as the location of storage of the particulars of the failure and factors accountable for the failure; a failure factor extracting means for extracting from said client failed executional environment database the particulars of the failure and factors accountable for the failure, and storing them into said client failure factor database; a client identifying means for identifying, on the basis of the hardware configuration information and the software configuration information on each of said plurality of client computers stored in said client configuration information database, the client computer(s) that may repeat the failure factor extracted by said failure factor extracting means; and a failure prediction information transmitting means for transmitting, to each client computer identified by said client identifying means, failure prediction information including the particulars of the failure and factors accountable for the failure, prioritized according to the relative gravity and frequency of failure; and each of said plurality of client computers comprises a failure prediction information database to serve as the location of storage of failure prediction information including the particulars of the failure and factors accountable for the failure; a failure prediction information receiving means for receiving the prioritized failure prediction information including the particulars of the failure and factors accountable for the failure from said server computer; a failure prediction information storing means for storing, in the order of priority, failure prediction information including the particulars of the failure and factors accountable for the failure into said failure prediction information database; a failure factor checking means for checking whether or not the executional environment of its own client computer currently in operation involves any of the failure factors stored in said failure prediction information database; and a failure prediction information notifying means for supplying an output unit with failure prediction information including the factors accountable for the failure and the particulars of the failure when said failure factor checking means has judged that the executional environment of its own client computer currently in operation involves any of the failure factors stored.

An sixth failure prediction system according to the invention comprises a plurality of client computers and a server computer for managing the plurality of client computers linked by a communication network, wherein: said server computer comprises a client failed executional environment database in which is stored, classified by the type of failure, information on the executional environment at the time of failure occurrence on each of said plurality of client computers; a client failure factor database to serve as the location of storage of the particulars of the failure and factors accountable for the failure; a failure factor extracting means for extracting from said client failed executional environment database the particulars of the failure and factors accountable for the failure, and storing them into said client failure factor database; a failure prediction information transmitting means for transmitting, to every client computer, all the failure prediction information including the particulars of the failure and factors accountable for the failure, stored in said client failure factor database; and each of said plurality of client computers comprises a failure prediction information database to serve as the location of storage of failure prediction information including the particulars of the failure and factors accountable for the failure; a failure prediction information receiving means for receiving the failure prediction information including the particulars of the failure and factors accountable for the failure from said server computer; a failure prediction information storing means for judging whether or not each piece of said information on the particulars of the failure and factors accountable for the failure occurrence that has been received relates to its own client computer and, if it does, storing it into said failure prediction information database or, if it does not, discarding them; a failure factor checking means for checking whether or not the executional environment of its own client computer currently in operation involves any of the failure factors stored in said failure prediction information database; and a failure prediction information notifying means for supplying an output unit with failure prediction information including the factors accountable for the failure and the particulars of the failure when said failure factor checking means has judged that the executional environment of its own client computer currently in operation involves any of the failure factors stored.

A first failure prediction method according to the invention comprises a step at which a server computer prepares, on the basis of information on the particulars of any failure that may arise in any client computer and the environment of execution at the time of failure occurrence, failure prediction information including the particulars of the failure and factors accountable for the failure, and transmits the prepared information to the client computer; and a step at which the client computer receives said failure prediction information including the particulars of the failure and factors accountable for the failure, and checks whether or not its own environment of execution involves the factors accountable for the failure.

A second failure prediction method according to the invention comprises a failure factor extracting step at which a server computer extracts from a client failed executional environment database in which is stored, classified by the type of failure, information on the executional environment at the time of failure occurrence on each of a plurality of client computers the particulars of the failure and factors accountable for the failure, and stores them into a client failure factor database; a client identifying step at which said server computer identifies from a client configuration information database, in which hardware configuration information and software configuration information on each of said plurality of client computers are stored, classified by client computer, the client computer(s) that may repeat the failure factor extracted at said failure factor extracting step; a failure prediction information transmitting step at which said server computer transmits, to each client computer identified at said client identifying step, failure prediction information including the particulars of the failure and factors accountable for the failure; a failure prediction information receiving step at which each of said plurality of client computers receives said failure prediction information including the particulars of the failure and factors accountable for the failure from said server computer; a failure prediction information storing step at which each of said plurality of client computers stores said failure prediction information including the particulars of the failure and factors accountable for the failure received at said failure prediction information receiving step into said failure prediction information database; a failure factor checking step at which each of said plurality of client computers checks whether or not the executional environment in which it is currently operating involves any of the failure factors stored in said failure prediction information database; and a failure prediction information notifying step at which each of said plurality of client computers supplies an output unit with failure prediction information including the factors accountable for the failure and the particulars of the failure when it has been judged at said failure factor checking step that the executional environment of its own client computer currently in operation involves any of the failure factors stored.

A third failure prediction method according to the invention comprises a configuration information transmitting step at which each of a plurality of client computers transmits its own hardware configuration information and software configuration information to a server computer; a configuration information receiving step at which said server computer receives hardware configuration information and software configuration information from each of said plurality of client computers; and a configuration information storing step at which said server computer stores, classified by client computer, the hardware configuration information and software configuration information received at said configuration information receiving step into a client configuration information database.

A fourth failure prediction method according to the invention comprises a failure detecting step at which each of a plurality of client computers detects any software failure having arisen in itself; a failed executional environment information transmitting step at which each of said plurality of client computers transmits, when any software failure has been detected at said failure detecting step, information on the particulars of the failure and on the executional environment at the time of the failure occurrence to a server computer; a failed executional environment information receiving step at which said server computer receives, from the client computer in which any software failure has arisen, information on the particulars of the failure and on the executional environment at the time of the failure occurrence; and a failed executional environment information storing step at which said server computer classifies, by the type of failure, the information on the particulars of the failure and on the executional environment at the time of the failure occurrence received at said failed executional environment information receiving step, and stores it into said client failed executional environment database.

A fifth failure prediction method according to the invention comprises a failure factor extracting step at which a server computer extracts from a client failed executional environment database in which is stored, classified by the type of failure, information on the executional environment at the time of failure occurrence on each of a plurality of client computers the particulars of the failure and factors accountable for the failure, and stores them into a client failure factor database; a client identifying step at which said server computer identifies from a client configuration information database, in which hardware configuration information and software configuration information on each of said plurality of client computers are stored, classified by client computer, the client computer(s) that may repeat the failure factor extracted at said failure factor extracting step; a failure prediction information transmitting step at which said server computer transmits, to each client computer identified at said client identifying step, failure prediction information including the particulars of the failure and factors accountable for the failure, prioritized according to the relative gravity and frequency of failure; a failure prediction information receiving step at which each of said plurality of client computers receives the prioritized failure prediction information including the particulars of the failure and factors accountable for the failure from said server computer; a failure prediction information storing step at which each of said plurality of client computers stores, in the order of priority, said failure prediction information including the particulars of the failure and factors accountable for the failure received at said failure prediction information receiving step into said failure prediction information database; a failure factor checking step at which each of said plurality of client computers checks whether or not the executional environment in which it is currently operating involves any of the failure factors stored in said failure prediction information database; and a failure prediction information notifying step at which each of said plurality of client computers supplies an output unit with failure prediction information including the factors accountable for the failure and the particulars of the failure when it has been judged at said failure factor checking step that the executional environment of its own client computer currently in operation involves any of the failure factors stored.

A sixth prediction failure prediction method according to the invention comprises a failure factor extracting step at which a server computer extracts from a client failed executional environment database in which is stored, classified by the type of failure, information on the executional environment at the time of failure occurrence on each of a plurality of client computers the particulars of the failure and factors accountable for the failure, and stores them into a client failure factor database; a failure prediction information transmitting step at which said server computer transmits, to every client computer, all the failure prediction information including the particulars of the failure and factors accountable for the failure, stored in said client failure factor database; a failure prediction information receiving step at which each of said plurality of client computers receives failure prediction information including the particulars of the failure and factors accountable for the failure from said server computer; a failure prediction information storing step at which each of said plurality of client computer judges whether or not each piece of said information on the particulars of the failure and factors accountable for the failure occurrence received at said failure prediction information receiving step relates to its own client computer and, if it does, stores it into said failure prediction information database or, if it does not, discards them; a failure factor checking step at which each of the plurality of client computers checks whether or not the executional environment in which it is currently operating involves any of the failure factors stored in said failure prediction information database; and a failure prediction information notifying step at which said client computer supplies an output unit with failure prediction information including the factors accountable for the failure and the particulars of the failure when it has been judged at said failure factor checking step that the executional environment of its own client computer currently in operation involves any of the failure factors stored.

A first recording medium according to the invention records thereon a program for causing: a server computer to execute processing to prepare, on the basis of information on the particulars of any failure that may arise in any client computer and the environment of execution at the time of failure occurrence, failure prediction information including the particulars of the failure and factors accountable for the failure, and to transmit the prepared information to the client computer; and the client computer to execute processing to receive from said server computer said failure prediction information including the particulars of the failure and factors accountable for the failure, and to check whether or not its own environment of execution involves the factors accountable for the failure.

A second recording medium according to the invention records thereon a program for causing: a server computer to execute failure factor extraction processing to extract from a client failed executional environment database in which is stored, classified by the type of failure, information on the executional environment at the time of failure occurrence on each of a plurality of client computers the particulars of the failure and factors accountable for the failure, and to store them into a client failure factor database; the server computer to execute client identification processing to identify from a client configuration information database, in which hardware configuration information and software configuration information on each of said plurality of client computers are stored, classified by client computer, the client computer(s) that may repeat the failure factor extracted by said failure factor extraction processing; the client computer to execute failure prediction information transmission processing to transmit, to each client computer identified by said client identification processing, failure prediction information including the particulars of the failure and factors accountable for the failure; each of the plurality of client computers to execute failure prediction information reception processing to receive said failure prediction information including the particulars of the failure and factors accountable for the failure from said server computer; each of the plurality of client computers to execute failure prediction information storage processing to store said failure prediction information including the particulars of the failure and factors accountable for the failure received by said failure prediction information reception processing into said failure prediction information database; each of the plurality of client computers to execute failure factor check processing to check whether or not the executional environment in which it is currently operating involves any of the failure factors stored in said failure prediction information database; and each of the plurality of client computers to execute failure prediction information notification processing to supply an output unit with failure prediction information including the factors accountable for the failure and the particulars of the failure when it has been judged by said failure factor check processing that the executional environment of its own client computer currently in operation involves any of the failure factors stored.

A third recording medium according to the invention records thereon a program for causing: each of a plurality of client computers to execute configuration information transmission processing to transmit its own hardware configuration information and software configuration information to a server computer; the server computer to execute configuration information reception processing to receive hardware configuration information and software configuration information from each of said plurality of client computers; the server computer to execute configuration information storage processing to store, classified by client computer, the hardware configuration information and software configuration information received by said configuration information reception processing into a client configuration information database.

A fourth recording medium according to the invention records thereon a program for causing each of a plurality of client computers to execute failure detection processing to detect any software failure having arisen in itself; each of said plurality of client computers to execute failed executional environment information transmission processing to transmit, when any software failure has been detected by said failure detection processing, information on the particulars of the failure and on the executional environment at the time of the failure occurrence to a server computer; the server computer to execute failed executional environment information reception processing to receive, from the client computer in which any software failure has arisen, information on the particulars of the failure and on the executional environment at the time of the failure occurrence; and the server computer to execute failed executional environment information storage processing to classify, by the type of failure, the information on the particulars of the failure and on the executional environment at the time of the failure occurrence received by said failed executional environment information reception processing into said client failed executional environment database.

A fifth recording medium according to the invention records thereon a program for causing: a server computer to execute failure factor extraction processing to extract from a client failed executional environment database in which is stored, classified by the type of failure, information on the executional environment at the time of failure occurrence on each of a plurality of client computers the particulars of the failure and factors accountable for the failure, and to store them into a client failure factor database; the server computer to execute client identification processing to identify from a client configuration information database, in which hardware configuration information and software configuration information on each of said plurality of client computers are stored, classified by client computer, the client computer(s) that may repeat the failure factor extracted by said failure factor extraction processing; the server computer to execute failure prediction information transmission processing to transmit, to each client computer identified by said client identification processing, failure prediction information including the particulars of the failure and factors accountable for the failure, prioritized according to the relative gravity and frequency of failure; each of the plurality of client computers to execute failure prediction information reception processing to receive the prioritized failure prediction information including the particulars of the failure and factors accountable for the failure from said server computer; each of the plurality of client computers to execute failure prediction information storage processing to store, in the order of priority, said failure prediction information including the particulars of the failure and factors accountable for the failure received by said failure prediction information reception processing into said failure prediction information database; each of the plurality of client computers to execute failure factor check processing to check whether or not the executional environment in which it is currently operating involves any of the failure factors stored in said failure prediction information database; and each of the plurality of client computers to execute failure prediction information notification processing to supply an output unit with failure prediction information including the factors accountable for the failure and the particulars of the failure when it has been judged by said failure factor check processing that the executional environment of its own client computer currently in operation involves any of the failure factors stored.

A sixth recording medium according to the invention records thereon a program for causing: a server computer to execute failure factor extraction processing to extract from a client failed executional environment database in which is stored, classified by the type of failure, information on the executional environment at the time of failure occurrence on each of a plurality of client computers the particulars of the failure and factors accountable for the failure, and to store them into a client failure factor database; the server computer to execute failure prediction information transmission processing to transmit, to every client computer, all the failure prediction information including the particulars of the failure and factors accountable for the failure, stored in said client failure factor database; each of the plurality of client computers to execute failure prediction information reception processing to receive failure prediction information including the particulars of the failure and factors accountable for the failure from said server computer; each of the plurality of client computer to execute failure prediction information storage processing to judge whether or not each piece of said information on the particulars of the failure and factors accountable for the failure occurrence received by said failure prediction information reception processing relates to its own client computer and, if it does, to store it into said failure prediction information database or, if it does not, to discard them; each of the plurality of client computers to execute failure factor check processing to check whether or not the executional environment in which it is currently operating involves any of the failure factors stored in said failure prediction information database; and each of the plurality of client computers to execute failure prediction information notification processing to supply an output unit with failure prediction information including the factors accountable for the failure and the particulars of the failure when it has been judged by said failure factor check processing that the environment of the client computer involves any of the failure factors stored.

BRIEF DESCRIPTION OF THE DRAWINGS

The invention will be understood more fully from the detailed description given below and from the accompanied drawings of preferred embodiments of the invention, which, however, should not be regarded as limiting the invention, but intended only for explanation and facilitation of understanding.

Here, it should be noted that like reference numerals represent like elements throughout the disclosure.

DETAILED DESCRIPTION OF THE PREFERRED EMBODIMENTS

Next will be described the present invention with reference to the drawings.

First will be described in detail the first preferred embodiment of the invention.

Figure 1:
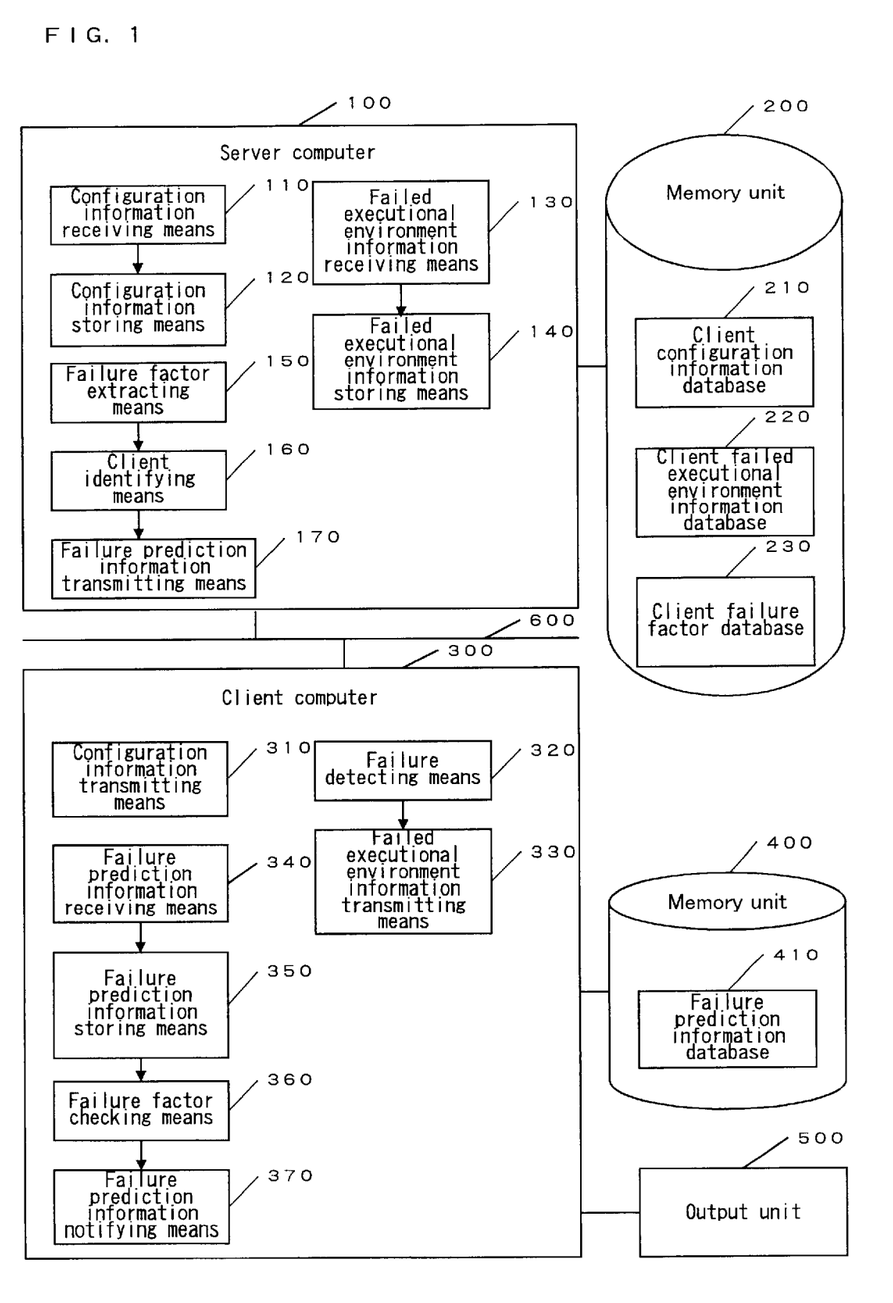
FIG. 1 is a block diagram of a first preferred embodiment of the present invention.

Referring to FIG. 1, the first preferred embodiment of the present invention consists of a server computer 100, a memory unit 200 connected to the server computer 100, a plurality of client computers 300, and a storage unit 400 and an output unit 500 both connected to each of the plurality of client computers 300. These server computer 100 and client computers 300, operating under programmed control, are connected to each other by a communication network 600.

The server computer 100 includes a configuration information receiving means 110, a configuration information storing means 120, a failed executional environment information receiving means 130, a failed executional environment information storing means 140, a failure factor extracting means 150, a client identifying means 160, and a failure prediction information transmitting means 170.

The memory unit 200 includes a client configuration information database 210, a client failed executional environment information database 220, and a client failure factor database 230.

Each of the client computers 300 includes a configuration information transmitting means 310, a failure detecting means 320, a failed executional environment information transmitting means 330, a failure prediction information receiving means 340, a failure prediction information storing means 350, a failure factor checking means 360, and a failure prediction information notifying means 370.

The memory unit 400 includes a failure prediction information database 410.

The output unit 500 may be a display unit, a printer or any other appropriate output unit.

The configuration information receiving means 110 receives from each of the plurality of client computers 300 the hardware configuration information and the software configuration information of the client computer 300.

The client configuration information database 210 serves as the storage location of the hardware configuration information and the software configuration information.

The configuration information storing means 120 receives, when software failure has arisen in any of the plurality of client computers 300, information on the executional environment of the execution at the time of failure occurrence on the client computer 300.

The client failed executional environment information database 220 serves as the storage location of information on the executional environment of the client computer 300 at the time of failure occurrence.

The failed executional environment information storing means 140 classifies information on the executional environment of the client computer 300 at the time of failure occurrence by the type of failure, and stores it into the client failed executional environment information database 220.

The client failure factor database 230 serves as the storage location of the particulars of the failure and factors accountable for the failure occurrence.

The failure factor extracting means 150 extracts the particulars of the failure and factors accountable for the failure occurrence from the client failed executional environment information database 220, and stores them into the client failure factor database 230.

The client identifying means 160 identifies, on the basis of the hardware configuration information and the software configuration information on each of the plurality of client computers 300 stored in the client configuration information database 210 and for each failure factor extracted by the failure factor extracting means 150, the client computer(s) 300 that may repeat the failure factor.

The failure prediction information transmitting means 170 transmits failure prediction information including the particulars of the failure and factors accountable for the failure occurrence to the client computer 300 so identified.

The configuration information transmitting means 310 transmits to the server computer the hardware configuration information and the software configuration information on the client computer 300 it belongs to.

The failure detecting means 320 detects any software failure that has arisen in the client computer 300 to which it belongs.

The failed executional environment information transmitting means 330, when software failure has arisen in the client computer 300 it belongs to, transmits the particulars of the failure and information on the executional environment of the client computer 300 at the time of failure occurrence.

The failure prediction information receiving means 340 receives failure prediction information including the particulars of the failure and factors accountable for the failure occurrence from the server computer 100.

The failure prediction information database 410 serves as the storage location of failure prediction information including the particulars of the failure and factors accountable for the failure occurrence.

The failure prediction information storing means 350 stores the received failure prediction information including the particulars of the failure and factors accountable for the failure occurrence into the failure prediction information database 410.

The failure factor checking means 360 checks whether or not the executional environment in which the client computer 300 to which it belongs is currently operating involves any of the failure factors stored in the failure prediction information database 410.

The failure prediction information notifying means 370 supplies failure prediction information including the factor accountable for that particular failure and the particulars of the failure to the output unit if the failure factor checking means 360 has judged that the factor accountable for the failure is present.

Figure 2:
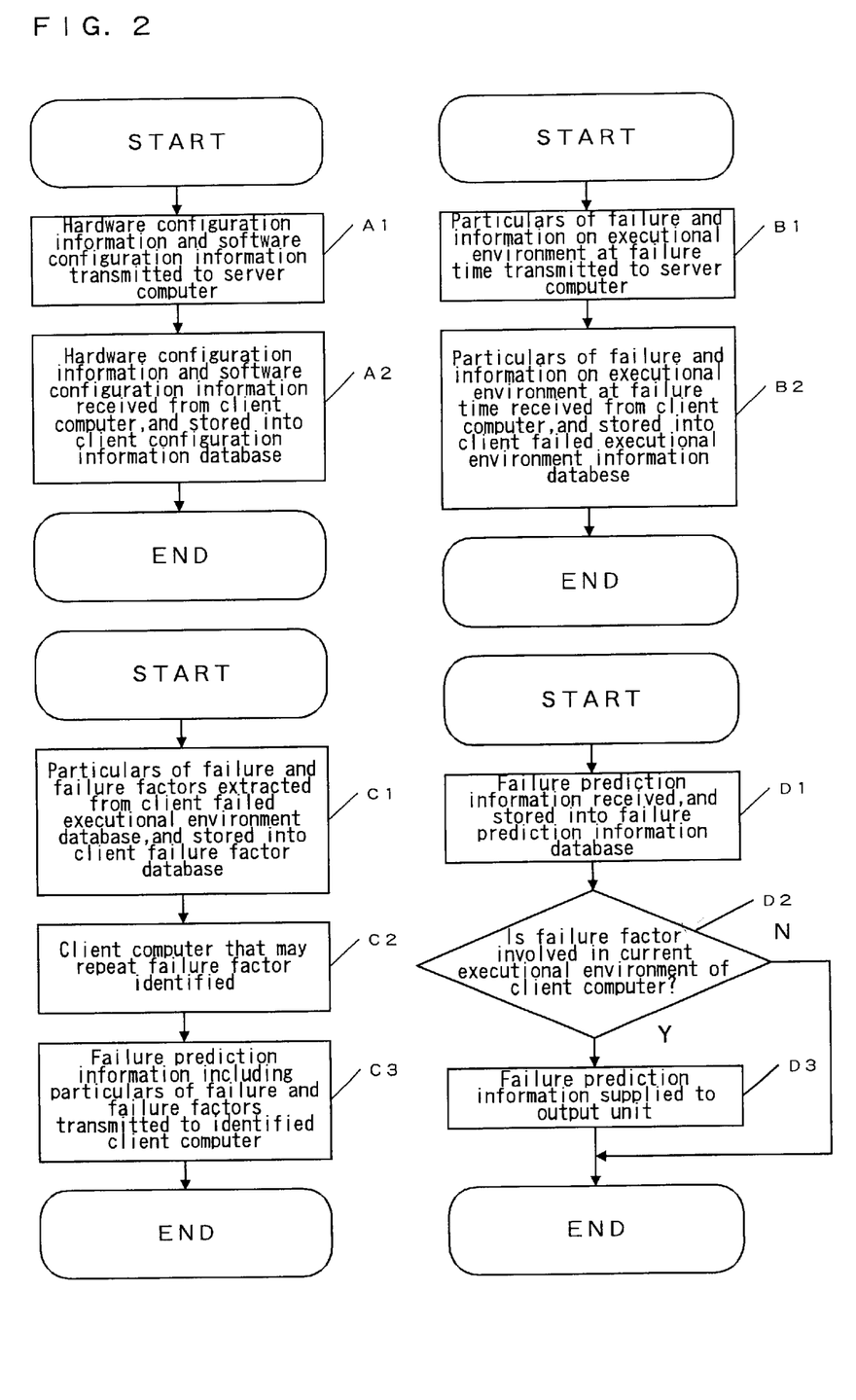
FIG. 2 is a flow chart showing how the first embodiment of the invention operates.

Next will be described in detail the overall operation of the first embodiment of the invention with reference to FIGS. 1 and 2.

First will be described in detail the preliminary operation for failure prediction.

Each of the plurality of client computers 300 transmits the hardware configuration information and the software configuration on itself to the server computer 100 (step A1). More specifically, the hardware configuration information that is transmitted includes "the mounted memory capacity is 256 MB" and "the CPU is a 200 MHz unit," and the software configuration information, "Software X and Software Y are installed."

In the server computer 100, on the other hand, the configuration information receiving means 110 receives hardware configuration information and software configuration information from each of the plurality of client computers 300, and stores the hardware configuration information and the software configuration information, classified by client computer 300, into the client configuration information database (step A2).

The foregoing preliminary operation for failure prediction may either be carried out only when the hardware configuration or the software configuration is altered such as additionally installing memories in the client computers or installing software, or when any client computer is started up.

Second will be described in detail the operation for information collection for failure prediction.

In each of the plurality of client computers 300, when the failure detecting means 320 has detected any software failure, the failed executional environment information transmitting means 330 transmits to the server computer 100 the unused memory capacity, unused hard disk capacity, software in simultaneous operation and other information on the executional environment together with the code of the software which has failed and other particulars of the failure (step B1). More specifically, such particulars of the failure as "failure A in software X occurred when unused memory capacity was below 5 MB" or "failure B in software X occurred during simultaneous execution with software Y" and information on the executional environment are transmitted.

On the other hand in the server computer 100, the failed executional environment information receiving means 130 receives the particulars of the failure and information on the executional environment at the time of failure occurrence from the client computer 300 in which the failure occurred, and the failed executional environment information storing means 140 stores into the client failed executional environment information database 220 information on the executional environment at the time of the occurrence of this particular failure, classified by the type of failure (step B2).

Third will be described in detail the operation of the server computer 100 to predict failure in any of the client computers 300.

The failure factor extracting means 150 of the server computer 100 extracts particulars of the failure and factors accountable for the failure from the client failed executional environment information database 220, and stores them into the client failure factor database 230 (step C1). More specifically, it extracts such particulars of the failure and factors accountable for the failure as "failure A in software X tends to occur when unused memory capacity is below 5 MB" or "failure B in software X tends to occur during simultaneous execution with software Y."

The client identifying means 160 identifies, on the basis of hardware configuration information and software configuration information on each of the plurality of client computers 300 stored in the client configuration information database 210 and for each failure factor extracted by the failure factor extracting means 150, the client computer(s) 300 that may repeat the failure factor (step C2). More specifically, if "failure B in software X tends to occur during simultaneous execution with software Y," it identifies the "client computer in which both software X and software Y are installed."

The failure prediction information transmitting means 170 transmits failure prediction information including the particulars of the failure and factors accountable for the failure occurrence to the client computer 300 identified by the client computer 300 (step C3). More specifically, in respect of the "client computer in which both software X and software Y are installed," it transmits the failure prediction information that "failure B in software X tends to occur during simultaneous execution with software Y."

On the other hand, the failure prediction information receiving means 340 of the identified client computer 300 receives failure prediction information including the particulars of the failure and factors accountable for the failure occurrence from the server computer 100, and the failure prediction information storing means 350 stores the failure prediction information into the failure prediction information database 410 (step D1). More specifically, it store into the failure prediction information database 410 the failure prediction information that, in the "client computer in which both software X and software Y are installed," "failure B in software X tends to occur during simultaneous execution with software Y."

The failure factor checking means 360 checks whether or not the executional environment in which the client computer 300 to which it belongs is currently operating involves any of the failure factors stored in the failure prediction information database 410 (step D2). More specifically, if the failure prediction information that "failure B in software X tends to occur during simultaneous execution with software Y," it checks if the client computer to which it belong is currently operating in an environment in which "software X and software are being executed simultaneously."

Further, the failure prediction information notifying means 370, if the failure factor checking means 360 judges that any failure factor is involved, notifies the user of that fact by supplying failure prediction information including the failure factor and the particulars of the failure to the output unit (step D3). More specifically, if the client computer it belongs to is operating in an environment wherein "software X and software are being executed simultaneously" and the failure prediction information that "failure B in software X tends to occur during simultaneous execution with software Y" is stored the failure prediction information database 410, it notifies the output unit that "failure B may arise because software X and software Y are being executed simultaneously."

Although the failure prediction information transmitting means 170 transmits failure prediction information to a client computer 300 in this embodiment of the invention, the failure prediction information as well be prioritized according to the relative gravity and frequency of failure, and the failure prediction information storing means 350 of the client computer 300 may store the failure prediction information in the order of priority. This is to give priority to the prediction of more likely failures than others by effectively utilizing the failure prediction information database 410 of a finite capacity.

Further, although the client identifying means 160 of the server computer identifies, on the basis of hardware configuration information and software configuration information on each of the plurality of client computers 300 stored in the client configuration information database 210, the client computer(s) 300 that may repeat the failure factor in this embodiment of the invention, this identification may as well be dispensed with, the failure prediction information transmitting means 170 may transmit all the failure prediction information including the particulars of the failure and the factors responsible for the failure stored in the client failure factor database 230 to every client computer 300, and each of the plurality of client computers 300 may judge whether or not each piece of the failure prediction information relates to itself, and, if it does not, may discard it. As this configuration this eliminates the need to prepare a client configuration information database 210 in the memory unit 200 of the server computer 100, the memory capacity of the server computer 100 can be saved.

Next will be described a second preferred embodiment of the invention with reference to drawings.

Figure 3:
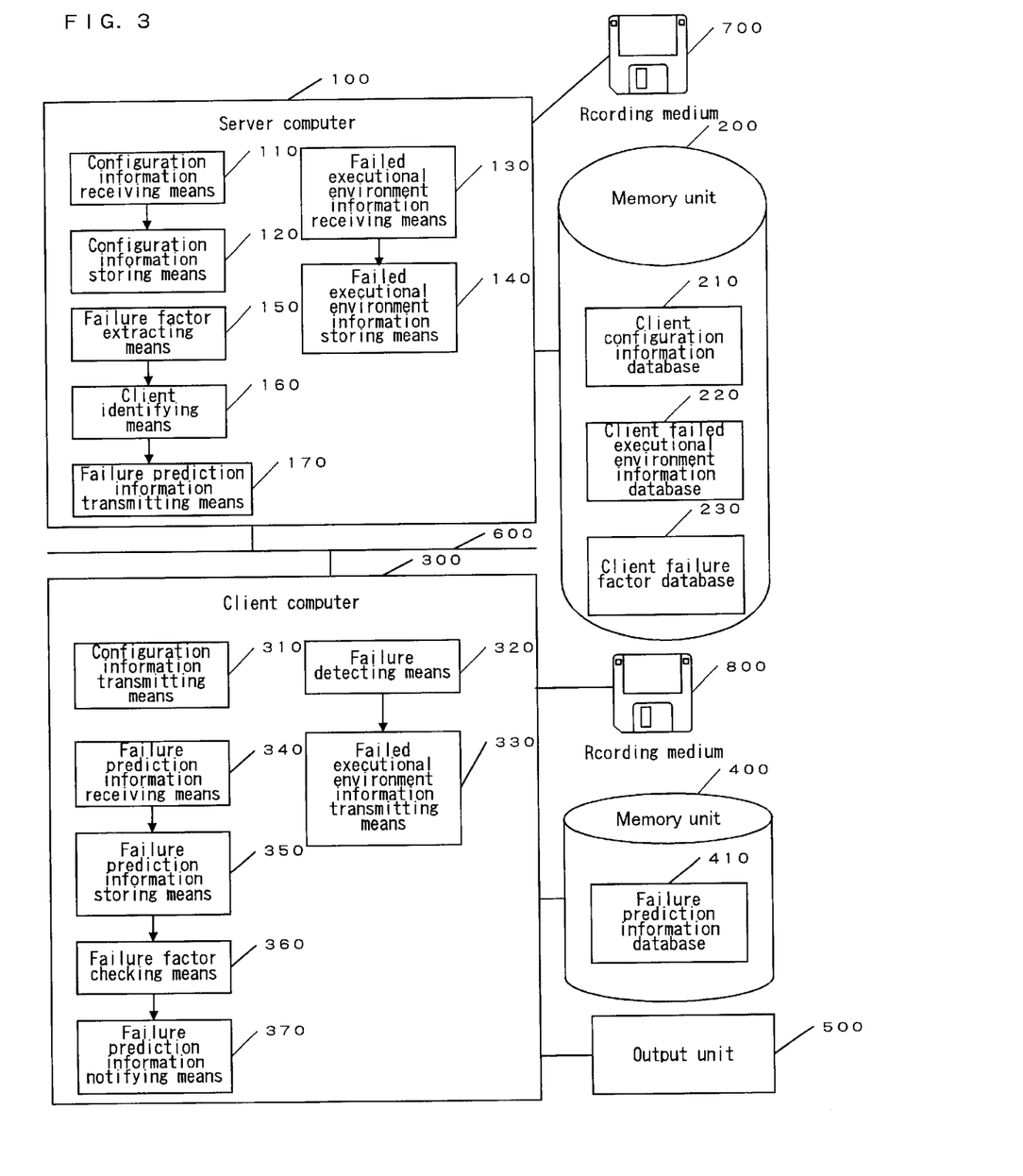
FIG. 3 is a block diagram of a second preferred embodiment of the invention.

Referring to FIG. 3, the second embodiment of the invention is provided with a recording medium 700 and a recording medium 800 recording a failure prediction program thereon. These recording media 700 and 800 may be floppy disks, magnetic disks, semiconductor memories or any other suitable recording media. The failure prediction program is read from the recording media 700 and 800 into the server computer 100 and the client computers 300 to control the operations of the server computer 100 and the client computers 300. The server computer 100 and the client computers 300 execute the above-described processing, i.e. the same processing as in the first embodiment of the invention under the control of the failure prediction program.

As hitherto described, the present invention provides for analysis of information on the environment of software execution when any software failure occurs and prediction of any more software failure that may subsequently arise based on the analysis result, it has the benefit of reducing the occurring frequency of software failures.

Although the invention has been described in detail so far with reference to different preferred embodiments thereof, it will be appreciated by those skilled in the art that these embodiments have been described solely for the purposes of illustration, but they are in no way to be regarded as limiting the invention. Instead, various modifications and substitutions of equivalent techniques will be readily apparent to those skilled in the art upon reading this specification, and such modifications and substitutions are to be regarded as falling within the true scope and spirit of the following claims.

What is claimed is:

1. A failure prediction system comprising a plurality of client computers and a server computer for managing the plurality of client computers linked by a communication network, wherein:

said server computer comprises:

a means for preparing, on the basis of information on the particulars of any failure that may arise in any client computer and the environment of execution at the time of failure occurrence, failure prediction information including the particulars of the failure and factors accountable for the failure, and transmitting the prepared information to some or all of said plurality of client computers; and each of said plurality of client computers comprises:

a means for receiving said failure prediction information including the particulars of the failure and factors accountable for the failure, and checking whether or not its own environment of execution involves the factors accountable for the failure.

2. A failure prediction system comprising a plurality of client computers and a server computer for managing the plurality of client computers linked by a communication network, wherein:

said server computer comprises:
a client configuration information database in which are stored, classified by client computer, hardware configuration information and software configuration information on each of said plurality of client computers;
a client failed executional environment database in which is stored, classified by the type of failure, information on the executional environment at the time of failure occurrence on each of said plurality of client computers;
a client failure factor database to serve as the location of storage of the particulars of the failure and factors accountable for the failure;
a failure factor extracting means for extracting from said client failed executional environment database the particulars of the failure and factors accountable for the failure, and storing them into said client failure factor database;
a client identifying means for identifying, on the basis of the hardware configuration information and the software configuration information on each of said plurality of client computers stored in said client configuration information database, the client computer(s) that may repeat the failure factor extracted by said failure factor extracting means; and
a failure prediction information transmitting means for transmitting, to each client computer identified by said client identifying means, failure prediction information including the particulars of the failure and factors accountable for the failure; and
each of said plurality of client computers comprises:
a failure prediction information database to serve as the location of storage of failure prediction information including the particulars of the failure and factors accountable for the failure;
a failure prediction information receiving means for receiving failure prediction information including the particulars of the failure and factors accountable for the failure from said server computer;
a failure prediction information storing means for storing failure prediction information including the particulars of the failure and factors accountable for the failure that has been received into said failure prediction information database;
a failure factor checking means for checking whether or not the executional environment of its own client computer currently in operation involves any of the failure factors stored in said failure prediction information database; and
a failure prediction information notifying means for supplying an output unit with failure prediction information including the factors accountable for the failure and the particulars of the failure when said failure factor checking means has judged that the executional environment of its own client computer currently in operation involves any of the failure factors stored.

3. A failure prediction system comprising a plurality of client computers and a server computer for managing the plurality of client computers linked by a communication network, wherein:
each of said plurality of client computers comprises:
a configuration information transmitting means for transmitting its own hardware configuration information and software configuration information to said server computer; and
said server computer comprises:
a configuration information receiving means for receiving hardware configuration information and software configuration information from each of said plurality of client computers,
a client configuration information database in which are stored, classified by client computer, hardware configuration information and software configuration information on each of said plurality of client computers, and
a configuration information storing means for storing hardware configuration information and software configuration information that has been received into said client configuration information database.

4. A failure prediction system comprising a plurality of client computers and a server computer for managing the plurality of client computers linked by a communication network, wherein:
each of said plurality of client computers comprises:
a failure detecting means for detecting any software failure having arisen in itself, and
a failed executional environment information transmitting means for transmitting, when any software failure has arisen in itself, information on the particulars of the failure and on the executional environment at the time of the failure occurrence to said server computer; and
said server computer comprises:
a failed executional environment information receiving means for receiving, from the client computer in which any software failure has arisen, information on the particulars of the failure and on the executional environment at the time of the failure occurrence,
a client failed executional environment database in which is stored, classified by the type of failure, information on the executional environment at the time of failure occurrence on each of said plurality of client computers, and
a failed executional environment information storing means for classifying, by the type of failure, said information on the particulars of the failure and on the executional environment at the time of the failure occurrence that has been received, and storing it into said client failed executional environment database.

5. A failure prediction system comprising a plurality of client computers and a server computer for managing the plurality of client computers linked by a communication network, wherein:
said server computer comprises:
a client configuration information database in which are stored, classified by client computer, hardware configuration information and software configuration information on each of said plurality of client computers;
a client failed executional environment database in which is stored, classified by the type of failure, information on the executional environment at the time of failure occurrence on each of said plurality of client computers;
a client failure factor database to serve as the location of storage of the particulars of the failure and factors accountable for the failure;
a failure factor extracting means for extracting from said client failed executional environment database the particulars of the failure and factors accountable for the failure, and storing them into said client failure factor database;

a client identifying means for identifying, on the basis of the hardware configuration information and the software configuration information on each of said plurality of client computers stored in said client configuration information database, the client computer(s) that may repeat the failure factor extracted by said failure factor extracting means; and a failure prediction information transmitting means for transmitting, to each client computer identified by said client identifying means, failure prediction information including the particulars of the failure and factors accountable for the failure, prioritized according to the relative gravity and frequency of failure; and each of said plurality of client computers comprises:

a failure prediction information database to serve as the location of storage of failure prediction information including the particulars of the failure and factors accountable for the failure;

a failure prediction information receiving means for receiving the prioritized failure prediction information including the particulars of the failure and factors accountable for the failure from said server computer;

a failure prediction information storing means for storing, in the order of priority, failure prediction information including the particulars of the failure and factors accountable for the failure into said failure prediction information database;

a failure factor checking means for checking whether or not the executional environment of its own client computer currently in operation involves any of the failure factors stored in said failure prediction information database; and a failure prediction information notifying means for supplying an output unit with failure prediction information including the factors accountable for the failure and the particulars of the failure when said failure factor checking means has judged that the executional environment of its own client computer currently in operation involves any of the failure factors stored.

6. A failure prediction system comprising a plurality of client computers and a server computer for managing the plurality of client computers linked by a communication network, wherein:

said server computer comprises:

a client failed executional environment database in which is stored, classified by the type of failure, information on the executional environment at the time of failure occurrence on each of said plurality of client computers;

a client failure factor database to serve as the location of storage of the particulars of the failure and factors accountable for the failure;

a failure factor extracting means for extracting from said client failed executional environment database the particulars of the failure and factors accountable for the failure, and storing them into said client failure factor database;

a failure prediction information transmitting means for transmitting, to every client computer, all the failure prediction information including the particulars of the failure and factors accountable for the failure, stored in said client failure factor database; and each of said plurality of client computers comprises:

a failure prediction information database to serve as the location of storage of failure prediction information including the particulars of the failure and factors accountable for the failure;

a failure prediction information receiving means for receiving the failure prediction information including the particulars of the failure and factors accountable for the failure from said server computer;

a failure prediction information storing means for judging whether or not each piece of said information on the particulars of the failure and factors accountable for the failure occurrence that has been received relates to its own client computer and, if it does, storing it into said failure prediction information database or, if it does not, discarding them;

a failure factor checking means for checking whether or not the executional environment of its own client computer currently in operation involves any of the failure factors stored in said failure prediction information database; and a failure prediction information notifying means for supplying an output unit with failure prediction information including the factors accountable for the failure and the particulars of the failure when said failure factor checking means has judged that the executional environment of its own client computer currently in operation involves any of the failure factors stored.

7. A failure prediction method comprising:

a step at which a server computer prepares, on the basis of information on the particulars of any failure that may arise in any client computer and the environment of execution at the time of failure occurrence, failure prediction information including the particulars of the failure and factors accountable for the failure, and transmits the prepared information to the client computer; and a step at which the client computer receives said failure prediction information including the particulars of the failure and factors accountable for the failure, and checks whether or not its own environment of execution involves the factors accountable for the failure.

8. A failure prediction method comprising:

a failure factor extracting step at which a server computer extracts from a client failed executional environment database in which is stored, classified by the type of failure, information on the executional environment at the time of failure occurrence on each of a plurality of client computers the particulars of the failure and factors accountable for the failure, and stores them into a client failure factor database;

a client identifying step at which said server computer identifies from a client configuration information database, in which hardware configuration information and software configuration information on each of said plurality of client computers are stored, classified by client computer, the client computer(s) that may repeat the failure factor extracted at said failure factor extracting step;

a failure prediction information transmitting step at which said server computer transmits, to each client computer identified at said client identifying step, failure prediction information including the particulars of the failure and factors accountable for the failure;

a failure prediction information receiving step at which each of said plurality of client computers receives said failure prediction information including the particulars of the failure and factors accountable for the failure from said server computer;

a failure prediction information storing step at which each of said plurality of client computers stores said failure prediction information including the particulars of the failure and factors accountable for the failure received at said failure prediction information receiving step into said failure prediction information database;

a failure factor checking step at which each of said plurality of client computers checks whether or not the executional environment in which it is currently operating involves any of the failure factors stored in said failure prediction information database; and a failure prediction information notifying step at which each of said plurality of client computers supplies an output unit with failure prediction information including the factors accountable for the failure and the particulars of the failure when it has been judged at said failure factor checking step that the executional environment of its own client computer currently in operation involves any of the failure factors stored.

9. A failure prediction method comprising:

a configuration information transmitting step at which each of a plurality of client computers transmits its own hardware configuration information and software configuration information to a server computer;

a configuration information receiving step at which said server computer receives hardware configuration information and software configuration information from each of said plurality of client computers; and a configuration information storing step at which said server computer stores, classified by client computer, the hardware configuration information and software configuration information received at said configuration information receiving step into a client configuration information database.

10. A failure prediction method comprising:

a failure detecting step at which each of a plurality of client computers detects any software failure having arisen in itself;

a failed executional environment information transmitting step at which each of said plurality of client computers transmits, when any software failure has been detected at said failure detecting step, information on the particulars of the failure and on the executional environment at the time of the failure occurrence to a server computer;

a failed executional environment information receiving step at which said server computer receives, from the client computer in which any software failure has arisen, information on the particulars of the failure and on the executional environment at the time of the failure occurrence; and a failed executional environment information storing step at which said server computer classifies, by the type of failure, the information on the particulars of the failure and on the executional environment at the time of the failure occurrence received at said failed executional environment information receiving step, and stores it into said client failed executional environment database.

11. A failure prediction method comprising:

a failure factor extracting step at which a server computer extracts from a client failed executional environment database in which is stored, classified by the type of failure, information on the executional environment at the time of failure occurrence on each of a plurality of client computers the particulars of the failure and factors accountable for the failure, and stores them into a client failure factor database;

a client identifying step at which said server computer identifies from a client configuration information database, in which hardware configuration information and software configuration information on each of said plurality of client computers are stored, classified by client computer, the client computer(s) that may repeat the failure factor extracted at said failure factor extracting step;

a failure prediction information transmitting step at which said server computer transmits, to each client computer identified at said client identifying step, failure prediction information including the particulars of the failure and factors accountable for the failure, prioritized according to the relative gravity and frequency of failure;

a failure prediction information receiving step at which each of said plurality of client computers receives the prioritized failure prediction information including the particulars of the failure and factors accountable for the failure from said server computer;

a failure prediction information storing step at which each of said plurality of client computers stores, in the order of priority, said failure prediction information including the particulars of the failure and factors accountable for the failure received at said failure prediction information receiving step into said failure prediction information database;

a failure factor checking step at which each of said plurality of client computers checks whether or not the executional environment in which it is currently operating involves any of the failure factors stored in said failure prediction information database; and a failure prediction information notifying step at which each of said plurality of client computers supplies an output unit with failure prediction information including the factors accountable for the failure and the particulars of the failure when it has been judged at said failure factor checking step that the executional environment of its own client computer currently in operation involves any of the failure factors stored.

12. A failure prediction method comprising:

a failure factor extracting step at which a server computer extracts from a client failed executional environment database in which is stored, classified by the type of failure, information on the executional environment at the time of failure occurrence on each of a plurality of client computers the particulars of the failure and factors accountable for the failure, and stores them into a client failure factor database;

a failure prediction information transmitting step at which said server computer transmits, to every client computer, all the failure prediction information including the particulars of the failure and factors accountable for the failure, stored in said client failure factor database;

a failure prediction information receiving step at which each of said plurality of client computers receives failure prediction information including the particulars of the failure and factors accountable for the failure from said server computer;

a failure prediction information storing step at which each of said plurality of client computer judges whether or not each piece of said information on the particulars of the failure and factors accountable for the failure occurrence received at said failure prediction information receiving step relates to its own client computer and, if it does, stores it into said failure prediction information database or, if it does not, discards them;

a failure factor checking step at which each of the plurality of client computers checks whether or not the executional environment in which it is currently operating involves any of the failure factors stored in said failure prediction information database; and a failure prediction information notifying step at which said client computer supplies an output unit with failure prediction information including the factors accountable for the failure and the particulars of the failure when it has been judged at said failure factor checking step that the executional environment of its own client computer currently in operation involves any of the failure factors stored.

13. A recording medium recording thereon a program to be implemented in a computer for causing:

a server computer to execute processing to prepare, on the basis of information on the particulars of any failure that may arise in any client computer and the environment of execution at the time of failure occurrence, failure prediction information including the particulars of the failure and factors accountable for the failure, and to transmit the prepared information to the client computer; and the client computer to execute processing to receive from said server computer said failure prediction information including the particulars of the failure and factors accountable for the failure, and to check whether or not its own environment of execution involves the factors accountable for the failure.

14. A recording medium recording thereon a program to be implemented in a computer for causing:

a server computer to execute failure factor extraction processing to extract from a client failed executional environment database in which is stored, classified by the type of failure, information on the executional environment at the time of failure occurrence on each of a plurality of client computers the particulars of the failure and factors accountable for the failure, and to store them into a client failure factor database;

the server computer to execute client identification processing to identify from a client configuration information database, in which hardware configuration information and software configuration information on each of said plurality of client computers are stored, classified by client computer, the client computer(s) that may repeat the failure factor extracted by said failure factor extraction processing;

the server computer to execute failure prediction information transmission processing to transmit, to each client computer identified by said client identification processing, failure prediction information including the particulars of the failure and factors accountable for the failure;

each of the plurality of client computers to execute failure prediction information reception processing to receive said failure prediction information including the particulars of the failure and factors accountable for the failure from said server computer;

each of the plurality of client computers to execute failure prediction information storage processing to store said failure prediction information including the particulars of the failure and factors accountable for the failure received by said failure prediction information reception processing into said failure prediction information database;

each of the plurality of client computers to execute failure factor check processing to check whether or not the executional environment in which it is currently operating involves any of the failure factors stored in said failure prediction information database; and each of the plurality of client computers to execute failure prediction information notification processing to supply an output unit with failure prediction information including the factors accountable for the failure and the particulars of the failure when it has been judged by said failure factor check processing that the executional environment of its own client computer currently in operation involves any of the failure factors stored.

15. A recording medium recording thereon a program to be implemented in a computer for causing:

each of a plurality of client computers to execute configuration information transmission processing to transmit its own hardware configuration information and software configuration information to a server computer;

the server computer to execute configuration information reception processing to receive hardware configuration information and software configuration information from each of said plurality of client computers; and the server computer to execute configuration information storage processing to store, classified by client computer, the hardware configuration information and software configuration information received by said configuration information reception processing into a client configuration information database.

16. A recording medium recording thereon a program to be implemented in a computer for causing:

each of a plurality of client computers to execute failure detection processing to detect any software failure having arisen in itself;

each of said plurality of client computers to execute failed executional environment information transmission processing to transmit, when any software failure has been detected by said failure detection processing, information on the particulars of the failure and on the executional environment at the time of the failure occurrence to a server computer;

the server computer to execute failed executional environment information reception processing to receive, from the client computer in which any software failure has arisen, information on the particulars of the failure and on the executional environment at the time of the failure occurrence; and the server computer to execute failed executional environment information storage processing to classify, by the type of failure, the information on the particulars of the failure and on the executional environment at the time of the failure occurrence received by said failed executional environment information reception processing into said client failed executional environment database.

17. A recording medium recording thereon a program to be implemented in a computer for causing:

a server computer to execute failure factor extraction processing to extract from a client failed executional environment database in which is stored, classified by the type of failure, information on the executional environment at the time of failure occurrence on each of a plurality of client computers the particulars of the failure and factors accountable for the failure, and to store them into a client failure factor database;

the server computer to execute client identification processing to identify from a client configuration information database, in which hardware configuration information and software configuration information on each of said plurality of client computers are stored, classified by client computer, the client computer(s) that may repeat the failure factor extracted by said failure factor extraction processing;

the server computer to execute failure prediction information transmission processing to transmit, to each client computer identified by said client identification processing, failure prediction information including the particulars of the failure and factors accountable for the failure, prioritized according to the relative gravity and frequency of failure;

each of the plurality of client computers to execute failure prediction information reception processing to receive the prioritized failure prediction information including the particulars of the failure and factors accountable for the failure from said server computer;

each of the plurality of client computers to execute failure prediction information storage processing to store, in the order of priority, said failure prediction information including the particulars of the failure and factors accountable for the failure received by said failure prediction information reception processing into said failure prediction information database;

each of the plurality of client computers to execute failure factor check processing to check whether or not the executional environment in which it is currently operating involves any of the failure factors stored in said failure prediction information database; and each of the plurality of client computers to execute failure prediction information notification processing to supply an output unit with failure prediction information including the factors accountable for the failure and the particulars of the failure when it has been judged by said failure factor check processing that the executional environment of its own client computer currently in operation involves any of the failure factors stored.

18. A recording medium recording thereon a program to be implemented in a computer for causing:

a server computer to execute failure factor extraction processing to extract from a client failed executional environment database in which is stored, classified by the type of failure, information on the executional environment at the time of failure occurrence on each of a plurality of client computers the particulars of the failure and factors accountable for the failure, and to store them into a client failure factor database;

the server computer to execute failure prediction information transmission processing to transmit, to every client computer, all the failure prediction information including the particulars of the failure and factors accountable for the failure, stored in said client failure factor database;

each of the plurality of client computers to execute failure prediction information reception processing to receive failure prediction information including the particulars of the failure and factors accountable for the failure from said server computer;

each of the plurality of client computer to execute failure prediction information storage processing to judge whether or not each piece of said information on the particulars of the failure and factors accountable for the failure occurrence received by said failure prediction information reception processing relates to its own client computer and, if it does, to store it into said failure prediction information database or, if it does not, to discard them;

each of the plurality of client computers to execute failure factor check processing to check whether or not the executional environment in which it is currently operating involves any of the failure factors stored in said failure prediction information database; and each of the plurality of client computers to execute failure prediction information notification processing to supply an output unit with failure prediction information including the factors accountable for the failure and the particulars of the failure when it has been judged by said failure factor check processing that the environment of the client computer involves any of the failure factors stored.

19. A group of recording media recording thereon a program to be implemented in a computer, wherein said program in claim 13 is divided into a plurality of portions and said portions are recorded on said media, respectively.

20. A computer data signal embodied in a carrier wave describing a program to be implemented in the computer for causing:

a server computer to execute processing to prepare, on the basis of information on the particulars of any failure that may arise in any client computer and the environment of execution at the time of failure occurrence, failure prediction information including the particulars of the failure and factors accountable for the failure, and to transmit the prepared information to the client computer; and the client computer to execute processing to receive from said server computer said failure prediction information including the particulars of the failure and factors accountable for the failure, and to check whether or not its own environment of execution involves the factors accountable for the failure.

21. A computer data signal embodied in a carrier wave describing a program to be implemented in the computer for causing:

a server computer to execute failure factor extraction processing to extract from a client failed executional environment database in which is stored, classified by the type of failure, information on the executional environment at the time of failure occurrence on each of a plurality of client computers the particulars of the failure and factors accountable for the failure, and to store them into a client failure factor database;

the server computer to execute client identification processing to identify from a client configuration information database, in which hardware configuration information and software configuration information on each of said plurality of client computers are stored, classified by client computer, the client computer(s) that may repeat the failure factor extracted by said failure factor extraction processing;

the server computer to execute failure prediction information transmission processing to transmit, to each client computer identified by said client identification processing, failure prediction information including the particulars of the failure and factors accountable for the failure;

each of the plurality of client computers to execute failure prediction information reception processing to receive said failure prediction information including the particulars of the failure and factors accountable for the failure from said server computer;

each of the plurality of client computers to execute failure prediction information storage processing to store said failure prediction information including the particulars of the failure and factors accountable for the failure received by said failure prediction information reception processing into said failure prediction information database;

each of the plurality of client computers to execute failure factor check processing to check whether or not the executional environment in which it is currently operating involves any of the failure factors stored in said failure prediction information database; and each of the plurality of client computers to execute failure prediction information notification processing to supply an output unit with failure prediction information including the factors accountable for the failure and the particulars of the failure when it has been judged by said failure factor check processing that the executional environment of its own client computer currently in operation involves any of the failure factors stored.

22. A computer data signal embodied in a carrier wave describing a program to be implemented in the computer for causing:

each of a plurality of client computers to execute configuration information transmission processing to transmit its own hardware configuration information and software configuration information to a server computer;

the server computer to execute configuration information reception processing to receive hardware configuration information and software configuration information from each of said plurality of client computers; and the server computer to execute configuration information storage processing to store, classified by client computer, the hardware configuration information and software configuration information received by said configuration information reception processing into a client configuration information database.

23. A computer data signal embodied in a carrier wave describing a program to be implemented in the computer for causing:

each of a plurality of client computers to execute failure detection processing to detect any software failure having arisen in itself;

each of said plurality of client computers to execute failed executional environment information transmission processing to transmit, when any software failure has been detected by said failure detection processing, information on the particulars of the failure and on the executional environment at the time of the failure occurrence to a server computer;

the server computer to execute failed executional environment information reception processing to receive, from the client computer in which any software failure has arisen, information on the particulars of the failure and on the executional environment at the time of the failure occurrence; and the server computer to execute failed executional environment information storage processing to classify, by the type of failure, the information on the particulars of the failure and on the executional environment at the time of the failure occurrence received by said failed executional environment information reception processing into said client failed executional environment database.

24. A computer data signal embodied in a carrier wave describing a program to be implemented in the computer for causing:

a server computer to execute failure factor extraction processing to extract from a client failed executional environment database in which is stored, classified by the type of failure, information on the executional environment at the time of failure occurrence on each of a plurality of client computers the particulars of the failure and factors accountable for the failure, and to store them into a client failure factor database;

the server computer to execute client identification processing to identify from a client configuration information database, in which hardware configuration information and software configuration information on each of said plurality of client computers are stored, classified by client computer, the client computer(s) that may repeat the failure factor extracted by said failure factor extraction processing;

the server computer to execute failure prediction information transmission processing to transmit, to each client computer identified by said client identification processing, failure prediction information including the particulars of the failure and factors accountable for the failure, prioritized according to the relative gravity and frequency of failure;

each of the plurality of client computers to execute failure prediction information reception processing to receive the prioritized failure prediction information including the particulars of the failure and factors accountable for the failure from said server computer;

each of the plurality of client computers to execute failure prediction information storage processing to store, in the order of priority, said failure prediction information including the particulars of the failure and factors accountable for the failure received by said failure prediction information reception processing into said failure prediction information database;

each of the plurality of client computers to execute failure factor check processing to check whether or not the executional environment in which it is currently operating involves any of the failure factors stored in said failure prediction information database; and each of the plurality of client computers to execute failure prediction information notification processing to supply an output unit with failure prediction information including the factors accountable for the failure and the particulars of the failure when it has been judged by said failure factor check processing that the executional environment of its own client computer currently in operation involves any of the failure factors stored.

25. A computer data signal embodied in a carrier wave describing a program to be implemented in the computer for causing:

a server computer to execute failure factor extraction processing to extract from a client failed executional environment database in which is stored, classified by the type of failure, information on the executional environment at the time of failure occurrence on each of a plurality of client computers the particulars of the failure and factors accountable for the failure, and to store them into a client failure factor database;

the server computer to execute failure prediction information transmission processing to transmit, to every client computer, all the failure prediction information including the particulars of the failure and factors accountable for the failure, stored in said client failure factor database;

each of the plurality of client computers to execute failure prediction information reception processing to receive failure prediction information including the particulars of the failure and factors accountable for the failure from said server computer;

each of the plurality of client computer to execute failure prediction information storage processing to judge whether or not each piece of said information on the particulars of the failure and factors accountable for the failure occurrence received by said failure prediction information reception processing relates to its own client computer and, if it does, to store it into said failure prediction information database or, if it does not, to discard them;

each of the plurality of client computers to execute failure factor check processing to check whether or not the executional environment in which it is currently operating involves any of the failure factors stored in said failure prediction information database; and each of the plurality of client computers to execute failure prediction information notification processing to supply an output unit with failure prediction information including the factors accountable for the failure and the particulars of the failure when it has been judged by said failure factor check processing that the environment of the client computer involves any of the failure factors stored.

* * * * *